(12) United States Patent
Jolfaei et al.

(10) Patent No.: US 9,838,505 B2
(45) Date of Patent: Dec. 5, 2017

(54) APPLICATION BASED CONTEXT POOLING

(71) Applicant: SAP SE, Walldorf (DE)

(72) Inventors: Masoud Aghadavoodi Jolfaei, Wiesloch (DE); Edgar Lott, Nussloch (DE); Frank Radmacher, Heidelberg (DE)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 14/966,115

(22) Filed: Dec. 11, 2015

(65) Prior Publication Data
US 2017/0171352 A1    Jun. 15, 2017

(51) Int. Cl.
*H04L 29/08* (2006.01)
*H04L 29/06* (2006.01)

(52) U.S. Cl.
CPC ............ *H04L 67/327* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 5,913,029 | A * | 6/1999 | Shostak | G06F 17/30572 707/999.201 |
| 7,337,226 | B2 * | 2/2008 | Saha | G06F 17/30457 709/223 |
| 7,792,975 | B1 * | 9/2010 | Dashora | H04L 67/14 709/203 |
| 9,635,088 | B2 * | 4/2017 | Sharma | H04L 67/02 |
| 2008/0271044 | A1 * | 10/2008 | Yordanov | G06F 8/60 718/108 |
| 2010/0161721 | A1 * | 6/2010 | Bolon | G06F 15/16 709/203 |
| 2010/0250740 | A1 * | 9/2010 | Cao | G06F 9/54 709/224 |
| 2013/0066948 | A1 * | 3/2013 | Colrain | H04L 67/146 709/203 |
| 2017/0171352 | A1 * | 6/2017 | Jolfaei | H04L 67/327 |

* cited by examiner

*Primary Examiner* — Natisha Cox
(74) *Attorney, Agent, or Firm* — Buckley, Maschoff & Talwalkar LLC (57) ABSTRACT

A method may receive a message from a first client associated with a first device type. A first application context associated with a session may be prepared for a response to the message based on the first device type. The response to the message may be prepared and the response may be transmitted to the first client via the session. The first application context associated with the session may be cleansed. Furthermore, the first application context associated with the session may be stored in a pool.

20 Claims, 5 Drawing Sheets

APPLICATION BASED CONTEXT POOLING

BACKGROUND

Computer networks provide a conduit for computers or other networked devices to exchange data. Networked devices, such as, but not limited to, various types of electronics, software based systems, and sensors, may be physically or wireless attached to a computer network. Each of these networked devices may collect and exchange data in a form of a message. For computer networks where a large quantity of messages are being transmitted over a short period of time (e.g., thousands of message per minute), a key challenge is to be able process a large quantity of incoming messages in real-time while minimizing a lag time of responses to the incoming messages.

For example, Message Queue Telemetry Transport (MQTT) is a messaging protocol that is useful for network communication where a small message footprint is required and/or network bandwidth is at a premium. However, even using a messaging protocol such as MQTT, processing of mass messages may be slowed due to an amount of time that it takes to establish a session for transmitting a response to each message.

DETAILED DESCRIPTION

The following description is provided to enable any person in the art to make and use the described embodiments. Various modifications, however, will remain readily apparent to those in the art.

When two networked devices on a computer network communicate, a session is utilized where the session comprises a series of interactions between the two networked devices that occur during the span of the communication. Typically, a first networked device sends a request for a connection and a second networked device may send an acknowledgment to the request. The two networked devices may take turns exchanging commands and data. However, in some embodiments, when multiple short messages are sent (e.g., each message being in an order of 200 bytes) and responses to the messages are transmitted back to the sender, a session may need to be created for each response. In this situation, creating each session may require more overhead (e.g., processor and memory resources) than sending the responses. Furthermore, the time to create each session may take longer than transmitting each response.

In some embodiments, to establish a session, a session layer of the Open Systems Interconnection model ("OSI model") may provides a mechanism for opening, closing and managing a session between networked devices. The OSI model may be implemented for messages being sent via a Transmission Control Protocol (TCP) and Internet Protocol (IP) (e.g., TCP/IP).

In the case of sending large quantities of messages, to speed up the processing of the messages, one strategy may invoke parallel processing based on stateless applications. A stateless application may comprise an application program that does not record data that is generated during the session (e.g., information about user settings and events that occurred for use in a next session with a user). Using stateless applications may increase throughput by increasing a number of required resources, (e.g., working processes and application servers). However, one of the drawbacks of stateless applications is a required time to establish an application context (e.g., context information associated with a session) for execution of each message.

A session may comprise an interface or container to provide configuration information to an application. A session may contain multiple application contexts. Different application components (e.g., application frameworks) may be initialized and used during execution of a request/task (e.g., processing of an HTTP request or a TCP/IP message). Each application component may require dedicated context information. The session and all included application contexts may be stored in processor registers, memory that is used by an application, or in control registers used by some operating systems to manage the application. Since, in stateless applications, information about user settings and events that occurred for use in a next session is not saved, continually creating application contexts for each session may require substantial overhead.

Figure 1:
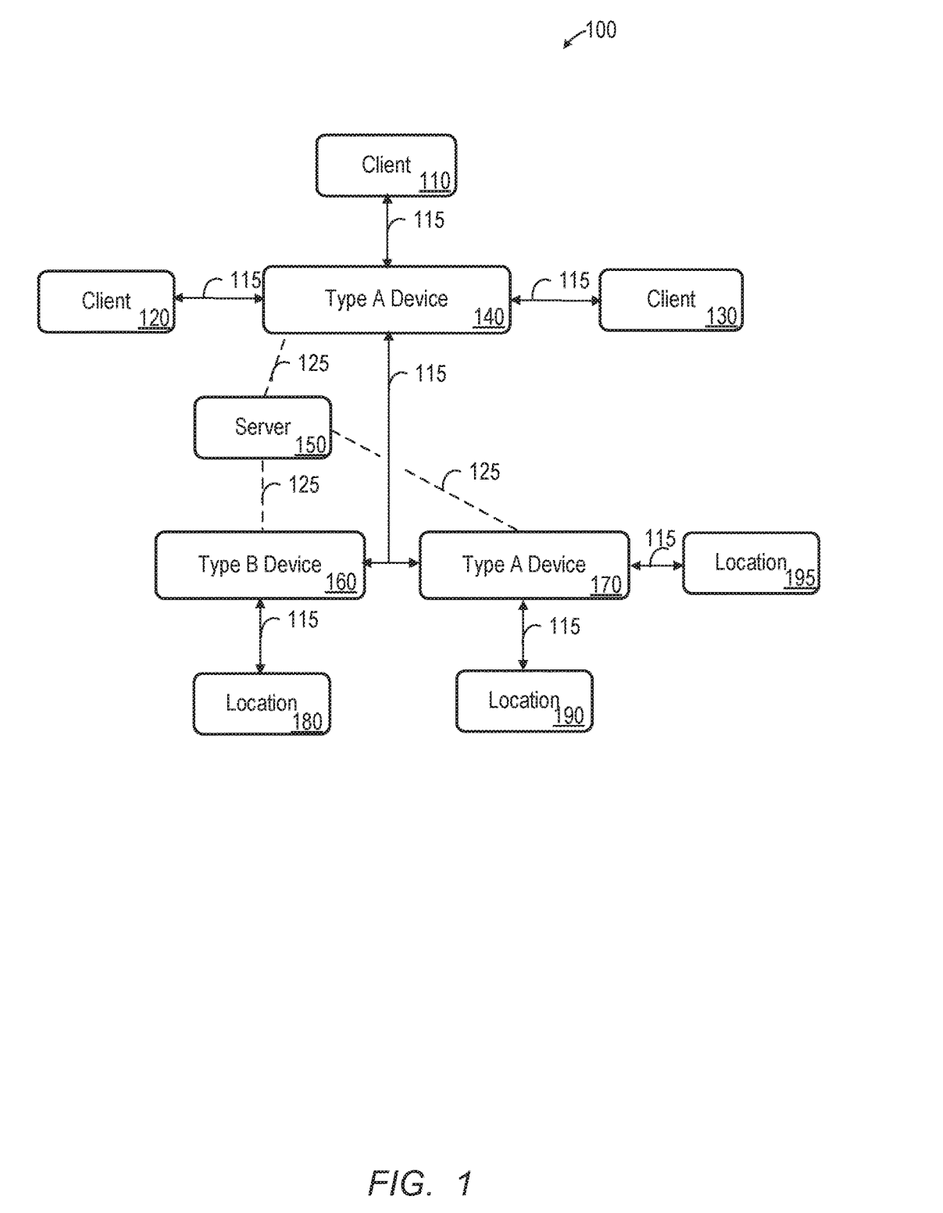
FIG. 1 is a computer network according to some embodiments.

Now referring to FIG. 1, an embodiment of a computer network 100 is illustrated. The computer network 100 may comprise a plurality of communication links 125 that are used for communication between various types of networked devices such as, but not limited to, type A device 140, type A device 170, type B device 160 and server 150.

In one embodiment, the computer network 100 may be implemented in an industrial facility having a plurality of clients 110/120/130 that are associated with moving items (e.g., packages, shipping boxes, parts, etc.) via a movement system 115 (e.g., a belt conveyor system). The clients 110/120/130 may move items via the movement system 115 to locations 180, 190 and 195. For example, client 110 may intend to move a box to location 190. Thereafter, the client 110 may place the box on movement system 115 and expect the box to be moved to location 190. The box may comprise a bar code that indicates a unique identifier of the box (e.g., a tracking identifier, serial number, part number, etc.). The bar code may be scanned when the box reaches type A device 140. In response to scanning the box, type A device 140 may send a first message to the server 150 to request instructions regarding movement of the box (e.g., a path that the box should use to move to location 190). The server 150 may receive the message from the type A device 140 and create a session to respond to the type A device 140. The response may comprise instructions in the form of a message.

In conventional systems, once the session is created, the server 150 may send instructions to type A device 140 and then delete the session. The type A device 140 may receive the instructions and the box may be moved along to type A device 170 where a second message will be sent to the server to determine where the box should be moved. Again, in conventional systems, the server 150 may create a brand new session and respond with instructions in the form of a second response message. Next, the second session may be deleted. Once the type A device 170 receives the second response message, the box may be moved along the movement system 115 to location 190.

However, as will be described below, the present embodiments relate to a method of cleansing sessions and placing the cleansed sessions into a pool that may be reused. In some embodiments, a session may utilize information from an application context. For the message that is sent from the server 150 to type A device 140, a session may be saved with information about the specific device and the application that is receiving the response (context information as will be described below).

For example, when sending the response messages as described above, the server 150 may create a session to communicate with the type A device 140 for the first response message and then respond with the instructions. The application context that was used in this session may be cleansed and saved with the session in a session pool. For a second response message to a type A device 140/170, the server may determine that a cleansed session for a type A device 140/170 exists and may use the cleansed session for sending the second response message.

In this example, responses from the server 150 may be required as fast as possible (e.g., preferably in real-time) and thus a size of the messages and the responses may be very small. For example, a size of the messages and the responses may each be in the order of 200 bytes. By using cleaned sessions, less overhead is required than recreating entirely new sessions. Thus, the server 150 may be able to provide faster responses to incoming messages.

When setting up a session, the server 150 must allocate resources (e.g., process, memory, etc.) for message handling. This may be considered phase 1 of setting up a session. In some embodiments, an authentication procedure to establish user specific context (i.e., information associated with user identification ("ID"), tenant ID, language, and assigned authorization roles) must be executed. This may be considered phase 2 of setting up a session.

Furthermore, an underlying application server framework (e.g. HTTP, REST, OData, etc.) which comprises two phases: (a) message independent initialization part and (b) message specific initialization part must be established. This two-part application server framework may be considered phase 3a and 3b of setting up a session.

Similarly, a business application context that comprises two parts: (a) message independent initialization part and (b) message specific initialization part must be established. This two-part business application context may be considered phase 4a and 4b of setting up a session. Finally, when the session is created, the message may be executed which may be considered phase 5 of setting up a session.

In order to speed up an execution time for a message the sessions may be pooled and reused. For each application context of a session, device/user-specifics (e.g., information from phases 1, 2, 3a, and 4a) are maintained in the session and may be reused for the execution of incoming messages because the phases 1, 2, 3a, and 4a are independent of the message that will be processed. By re-using the information from phases 1, 2, 3a, and 4a, processing time to establish the application context information in the session may be reduced.

Only when a message is received may the message-specific parts of a session (e.g., phases 3b, 4b and 5) be created. The application context of a session may be defined as a state in memory that is established during the phases 1, 2, 3a, and 4a. After the message is executed, the existing session is prepared for future message reception by appropriate cleanup and initialization of memory states and put back to the session pool.

For application-specific context pooling, pools of message-independent application sessions are maintained for each type of application or apparatus. For example, type A device and type B device may each require to establish a session including their respective application contexts. This process may result in a reduced message processing time (i.e., a time from message reception until an end of its execution).

Figure 2:
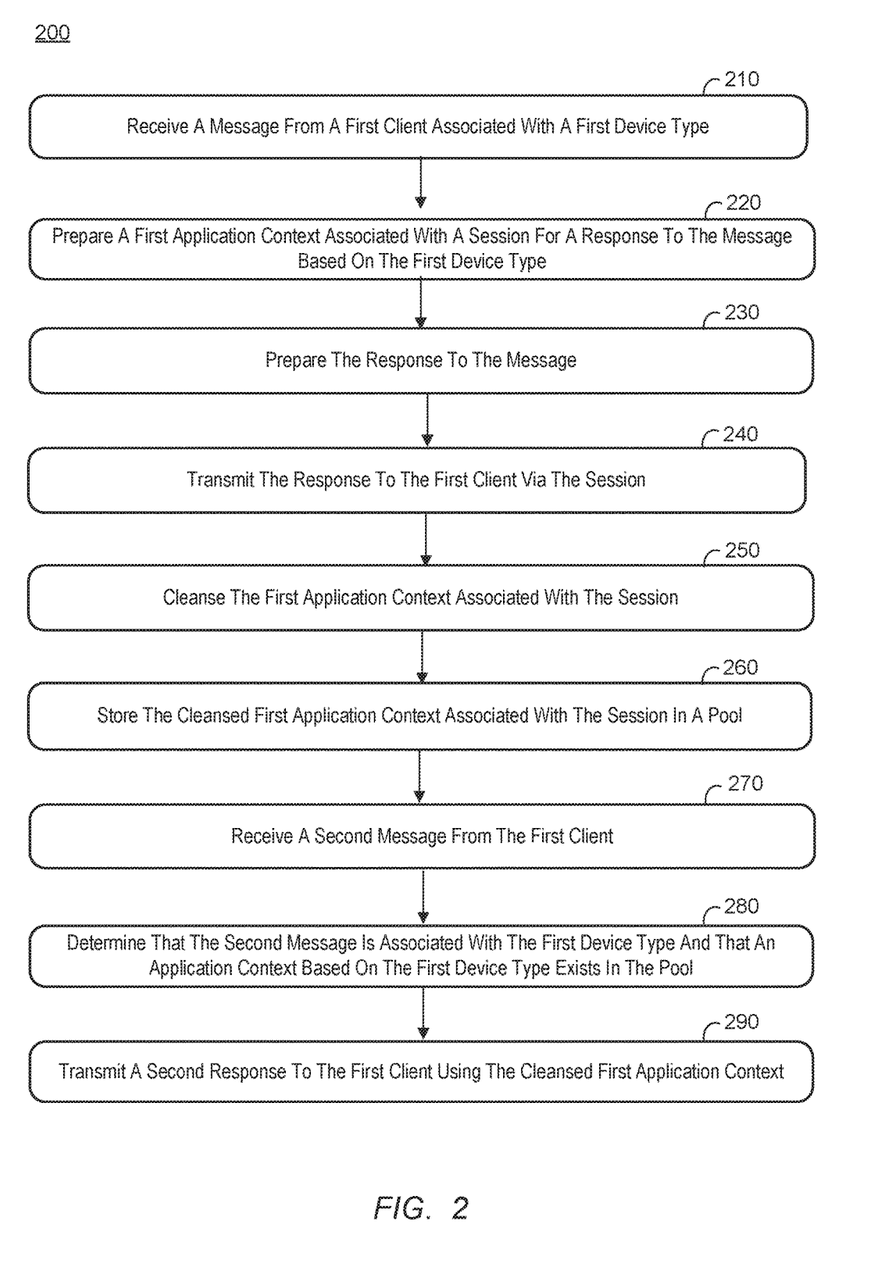
FIG. 2 is a process according to some embodiments.
Figure 5:
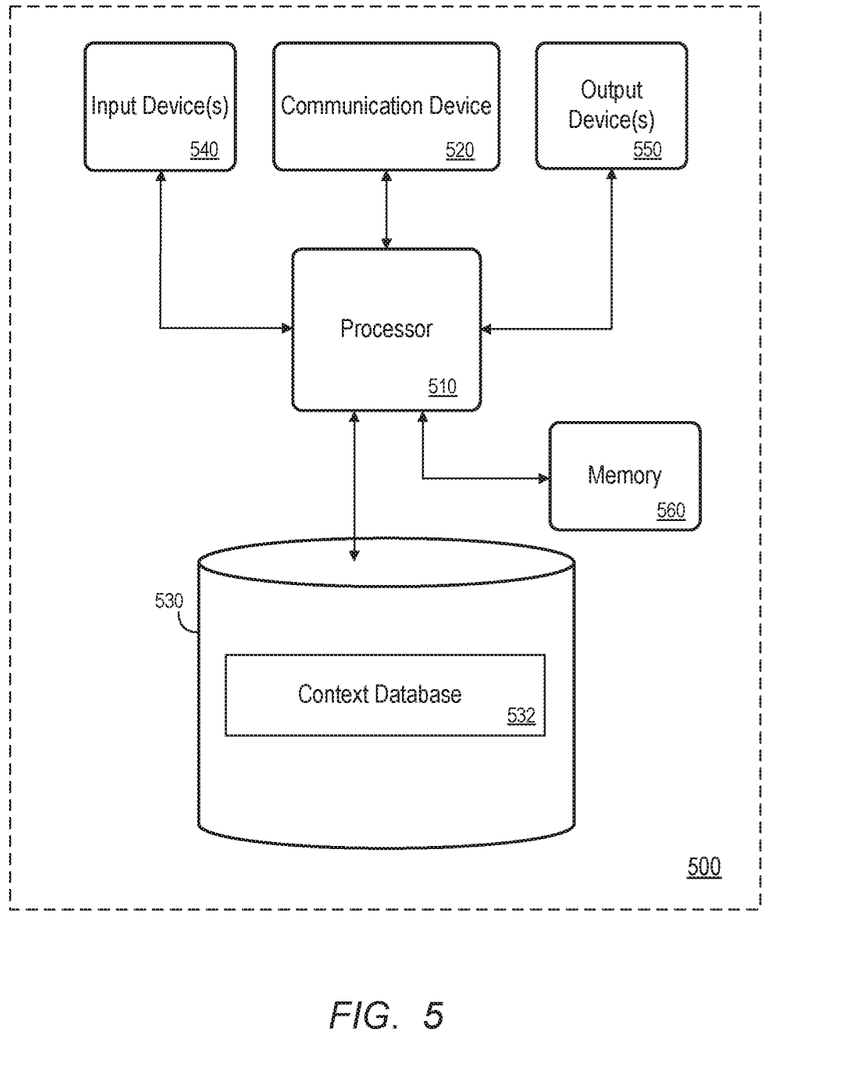
FIG. 5 is a block diagram of an apparatus according to some embodiments.

Now referring to FIG. 2, an embodiment of a process 200 is illustrated. In some embodiments, various hardware elements of system 500 execute program code to perform process 200. Process 200, and all other processes mentioned herein, may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments.

Although process steps may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

At 210, a message may be received from a first client associated with a first device type. The message may comprise a short message such as a message utilizing an MQTT messaging protocol. However, the message may utilize any messaging protocol that is practical. The message may be received at a task handler.

For illustrative purposes, and to aid in understanding features of the specification, an example will now be introduced. This example is not intended to limit the scope of the claims.

Figure 3:
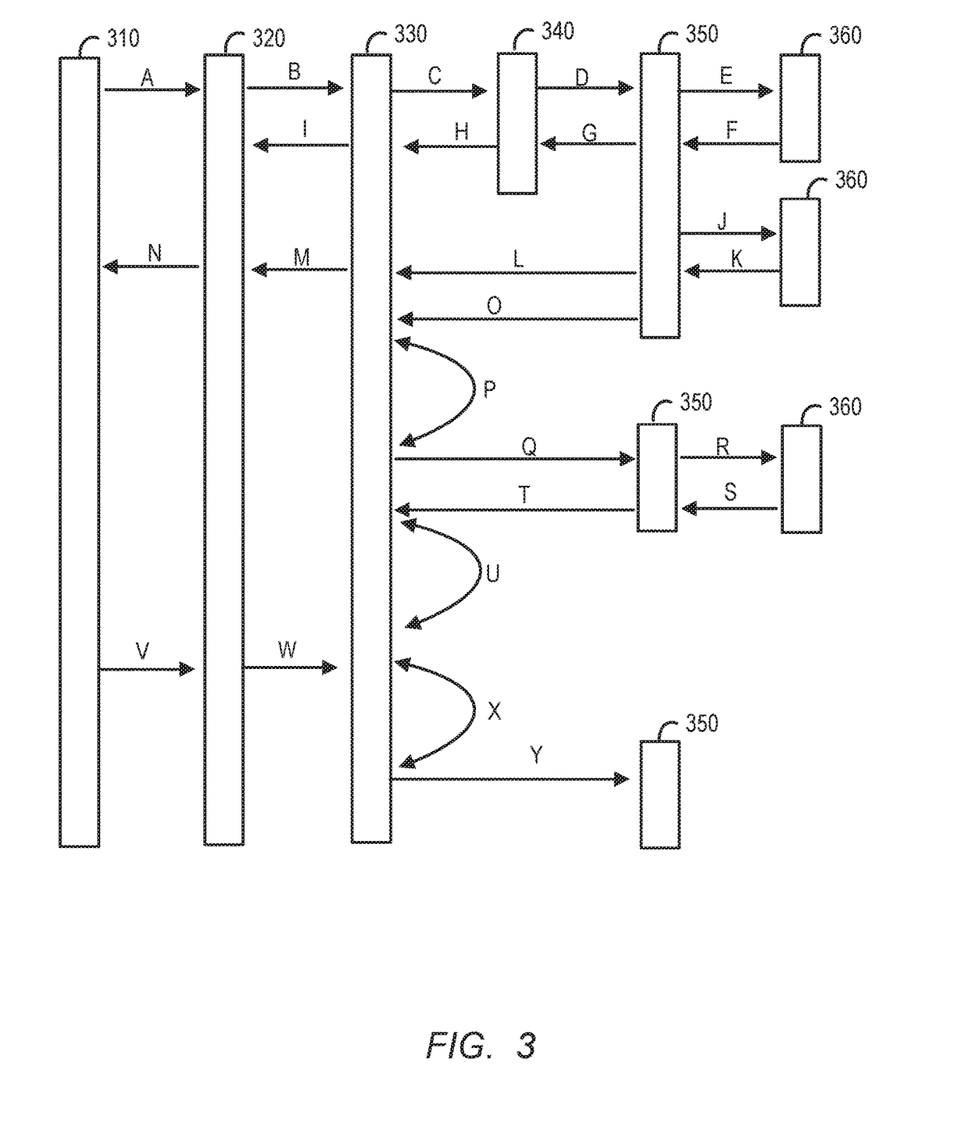
FIG. 3 illustrates message flow according to some embodiments.

Now referring to FIG. 3 an embodiment of a flow diagram 300 is illustrated. FIG. 3 may illustrate flow associated with a message being sent between a client 310 and a server 350 that comprises an application 360 to respond to incoming messages. FIG. 3 may further illustrate a simple interaction model for message handling associated with TCP/IP communication. While a TCP/IP client is described in this example, the client 310 may comprise any client 310 having a socket layer such as, but not limited to, Hypertext Transfer Protocol ("HTTP"), RSA, or any other socket layer client. The flow diagram 300 may also illustrates an internet communication manager ("ICM") 320 that may comprise a proxy service such as an HTTP proxy; a task handler 330 which may comprise a layer of a kernel such as, but not limited to, an SAP kernel; and an internet communication framework ("ICF") 340 to facilitate communication with different systems (e.g., an SAP system) using Internet standard protocols such as HTTP, HTTPS or SMTP.

At A, a connection phase is initiated by the client 310 by sending a message which initiates a request for a connection. The request for a connection may be received at the ICM 320 which may be sent to task handler 330 at B. In some embodiments, the request for a connection may be sent directly to the task handler 330. The request for a connection may be sent from the task handler 330 to the ICF 340 at C and the ICF may initiate a setup of a session for the message. At D, the request for a connection may be sent to the server 350 and the request for a connection may be sent to the application 360 at E where an acknowledgment to the request for a connection may be prepared. In response to receiving the message, the application 360 may send an acknowledgement to the request for a connection to the server 350 at F. The acknowledgment may then be sent to the ICF 340 at G, to the task handler at H and finally to the ICM at I.

Referring back to FIG. 2, at 220, a first application context associated with a session may be prepared for a response to the message based on the first device type. In response to the message being received, the server 350 may allocate resources (e.g., process, memory, etc.) for responding to the message. If the message indicated a user ID, the server may also utilize an authentication procedure to establish user specific context. A message independent initialization part of an application server framework and a message specific initialization part of an application server framework may be created in response to the message. Similarly, a message independent initialization part of a business application context and a message specific initialization part of a business application context may be created. The application context associated with the session for the message may be created by the application 360.

Referring again to FIG. 2, at 230, a response to the message is prepared. The response to the message may comprise a query based on information contained within the message. For example, as described with respect to the example in FIG. 1, if the message contained information regarding a type of product contained in the box and a current location of the product, the response may comprise, for example, a location to store the box and a path for the box to traverse. Referring now to FIG. 3, the server 350, at J, may send a request for the application 360 to execute the message and prepare a response. The application 360 may parse the message to extract information needed for responding to the message. The application 360 may then prepare a response to the message. For example, the application 360 may perform a lookup in a database to retrieve information needed for responding to the message.

The response may be transmitted to the first client via the session at 240. For example, at K, the response may be sent from the application 360 to the server 350. The server 350 may send the response to the task handler 330 at L. The task handler 330 may send the response to the ICM at M and then the response may be received at the client at N. The server 360 may also terminate the session with the task handler 330 at O.

The first application context associated with the session may be cleansed at 250. Cleaning the first application context may be associated with cleansing a session that may be reused and placed in a pool. The task handler 330 may initiate a clean up of the session, at P, and save the cleansed session for reuse. Instead of elimination of the session including corresponding resource information (e.g., information stored in memory), the task handler 330 may delete only specific resources (e.g., application specific data such as, but not limited to, objects and internal tables) from the session. For example, the specific resources may comprise objects associated with Advanced Business Application Programming ("ABAP") or JAVA code. In this way a session object may be cleansed and may be repopulated with message specific information when required.

Additionally, the task handler 330 may initiate a pooling preparation phase at Q, which enables a server framework responsible for execution/dispatching of the TCP/IP application to initialize the global data for a session which may be used for the execution of the application associated with the TCP/IP connection. The server framework may delegate this activity to the application, at R, by executing an event "on_context_pool_init" to enable the application 360 to initialize its global data for message handling. An application may comprise multiple application components (e.g., application frameworks) which run with the application in the same session. Therefore, the event "on_context_pool_init" can be accessed by each application component to initialize its respective application context. In this phase, message independent information (e.g., connection/device specific metadata) may be cached in the pooled session/application context. In some embodiments, the metadata may be retrieved from a database storing device specific metadata.

After the session is cleansed, it may be prepared for addition to the pool. The preparation of the session, before it is added to the pool, may be composed into three parts. The first part may comprise user-specific data related to phase 1 and phase 2 as described above. This first part prepares the application context by saving information associated with phases 1 and 2 (e.g., application server resources, user information and authorization) into the application context of the session. In some embodiments, because the user-specific information of a running application remain nearly unchanged, this information may be added into the application context by unwinding the TCP/IP stack up to the user-specific context.

Additionally, the session may be prepared by saving the initialization parts of phase 3a (e.g., initialization of an application server and communication frameworks such as, but not limited to, an SAP Remote Function Call (RFC), HTTP protocol, or OData services).

The domain specific information associated with a session may be reloaded and reinitializing before the application context is added to the pool. The domain of a running application is fixed. Therefore, each domain-specific framework may be reloaded and reinitialized and information associated with the initialized domain-specific framework may be added to the application context.

Additionally, the session may be further prepared by executing the application coding of phase 4a (e.g., initialize parts of the business application that are identical for every message). This may be performed by an API that gathers information from a business application where the information specifies the message-independent parts of the business application. For example, this may be achieved via a registration of a callback function or via an extension of an existing event-based API for message processing associated with a new event. The API may be triggered by the application server after the clean-up phase to allow the frameworks to create the message-independent parts of the business application in advance of a next response.

Figure 4:
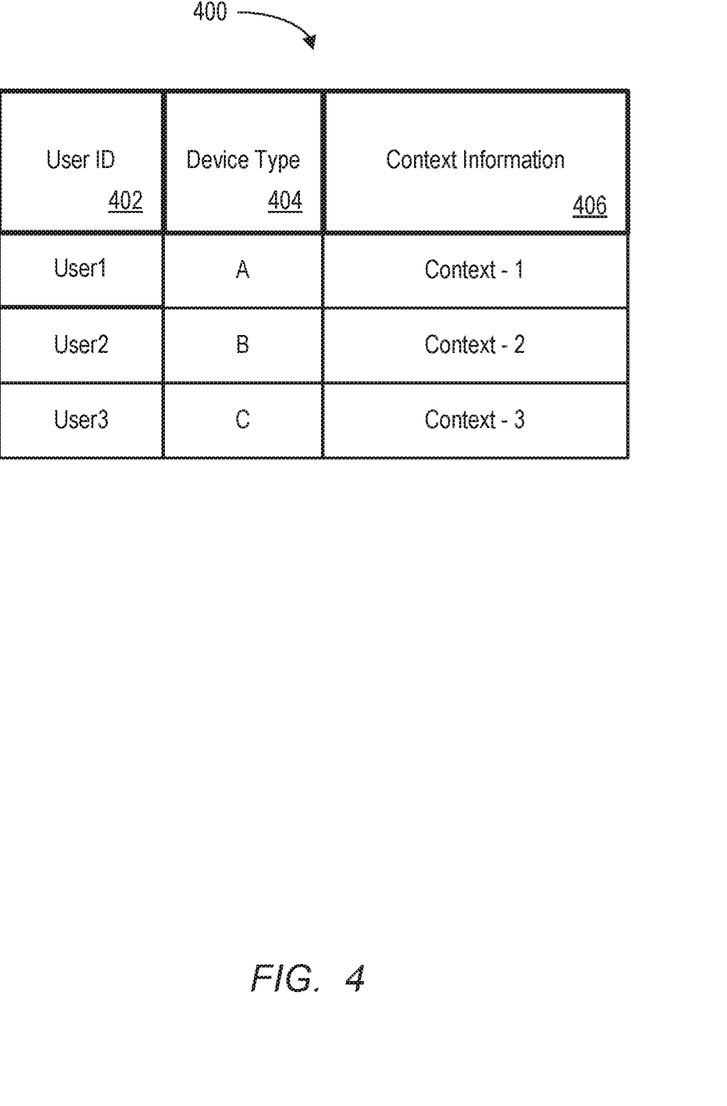
FIG. 4 illustrates a portion of a database that might be stored in accordance with some embodiments.

At 260, the cleansed first application context associated with the session may be stored in a pool. Referring again to FIG. 3, the session that has been cleansed of user specific data and populated with global metadata may be moved (e.g., pushed) from the application at S to a pool area for reuse at T and placed in the pool at U. In some embodiments, the pool may be associated with a database that defines a plurality of fields. For example, and now referring to FIG. 4, a table 400 is illustrated. The table 400 may represent a database table that may be stored locally at the apparatus 500 according to some embodiments. The table 400 may include, for example, entries relating to context information, device type information and user identification. The table 400 may also define fields 402, 404, 406 for each of the entries. The fields 402, 404, 406 may, according to some embodiments, specify: a user identification 402, a device type 404, and context information 406. In some embodiments, the table 400 may also define a field associated with a session time to live (e.g., a time out for each session).

Referring back to FIG. 2, at 270 a second message is received from the first client. Once a session associated with a context for a specific device type is stored in the pool, any incoming messages associated with the specific device type may be handled by a pooled session as long as the pooled session contains a context for the device type. In the present example of FIG. 3, a second message is received on the TCP/IP connection for the client 310 at V and W.

At 280, a determination is made that the second message is associated with the first device type and that an application context based on the first device type exists in the pool. In other words, a determination is made as to if any application contexts in the pool exist for the specific device type associated with the incoming message. An assignment of a pooled session for responding to the new incoming message may be handled by the task handler 330 at X. If a pooled session is available this pooled session may be used for a response for the processing of the second message at Y.

At 290, a second response may be transmitted to the first client using the cleansed first application context. After successful execution of the second message, the steps for re-using the session as a pooled session may be applied according to the above-mentioned procedure. In a case that no pooled sessions are available for the second message, a new session for processing of the second message may be created.

In some embodiments, a third message may be received from a second client associated with a second device type. In a case that an application context associated with the second device type does not exists in the pool, an application context associated with the second device type may be created and used with a new session. Once the application context associated with the second device type is created, a response to the second client using the second application context may be transmitted. In a case that a fourth message from the second client associated with the second device type is received, a determination may be made as to if an application context that is associated with the second context associated with the second device type exists in the pool. If the application context associated with the second device type exists in the pool then a response to the second client using the second application context may be transmitted.

Application contexts from the pool may be removed (e.g., to free allocated resources) when a pooled application context is not used after a specific amount of time. Therefore, a size of a pool and a life time of pooled contexts may be determined for each application context stored in the pool. Overhead associated with process comprises instantiations of objects to create a session, as well as querying a database for metadata associated with a particular type of client. Since only small objects may need to be created in response to an incoming message when using cleaned sessions, the present process may use less overhead than completely recreating sessions.

One benefit of application context pooling for processing of parallel messages of an application depends on the size of the pool. When a number of messages that are received in parallel exceeds the number of stored session in the pool, the present process may use the usual context creation (phases 1-4) without cleansing and reusing sessions and their associated application contexts. In this way, application context pooling may be tolerant with respect to peak loads.

FIG. 5 is a block diagram of apparatus 500 according to some embodiments. Apparatus 500 may comprise an application server that executes program code to perform any of the processes described herein. Apparatus 500 may include other unshown elements according to some embodiments.

Apparatus 500 includes processor 510 operatively coupled to memory 560, data storage device 530, an input device 540, and an output device 550. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device 540 may be used, for example, to enter information into apparatus 500. Output device 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Data storage device 530 may comprise program code associated with a context pool 532 executed by processor 510 to cause apparatus 500 to perform any one or more of the processes described herein. Embodiments are not limited to execution of these processes by a single apparatus. Data storage device 530 may also include one or more database tables for use with process 200. For example, the database tables may store information associated with a context pool.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the above-mentioned process may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A system comprising:
a memory storing processor-executable process steps; and
a processor to execute the processor-executable process steps to cause the system to:
receive a message from a first client associated with a first device type;
prepare a first application context associated with a session for a response to the message based on the first device type;
prepare the response to the message;
transmit the response to the first client via the session;
cleanse the first application context associated with the session; and
store the cleansed first application context associated with the session in a pool.

2. The system of claim 1, wherein the processor is further to execute the processor-executable process steps to cause the system to:
receive a second message from the first client;
determine that the second message is associated with the first device type and that an application context based on the first device type exists in the pool; and
transmit a second response to the first client using the cleansed first application context.

3. The system of claim 2, wherein the processor is further to execute the processor-executable process steps to cause the system to:
receive a third message from a second client associated with a second device type;
determine that an application context associated with the second device type does not exist in the pool;
create a application context associated with the second device type for use with a second session; and
transmit a third response to the second client using the second session.

4. The system of claim 3, wherein the processor is further to execute the processor-executable process steps to cause the system to:
receive a fourth message from the second client associated with the second device type;
determine that the second application context associated with the second device type exists in the pool; and
transmit a fourth response to the second client using the second context.

5. The system of claim 1, wherein cleansing the first application context comprises deleting application specific data.

6. The system of claim 5, wherein the application specific data comprises objects and internal tables.

7. The system of claim 5, wherein cleansing further comprises:
preparing the first application context by saving application server resources and initializing application server and communication frameworks in the first application context.

8. A computer-implemented method comprising:
receiving a message from a first client associated with a first device type;
preparing, via a processor, a first application context associated with a session for a response to the message based on the first device type and an authorization role of the first client;
preparing the response to the message;
transmitting the response to the first client via the session;
cleansing the first application context associated with the session; and
storing the cleansed first application context associated with the session in a pool.

9. The method of claim 8, further comprising:
receiving a second message from the first client;
determining that the second message is associated with the first device type and that an application context based on the first device type exists in the pool; and
transmitting a second response to the first client using the cleansed first application context.

10. The method of claim 9, further comprising:
receiving a third message from a second client associated with a second device type;
determining that an application context associated with the second device type does not exist in the pool;
creating a application context associated with the second device type for use with a second session; and
transmitting a third response to the second client using the second session.

11. The method of claim 10, further comprising:
receiving a fourth message from the second client associated with the second device type;
determining that the second application context associated with the second device type exists in the pool; and
transmitting a fourth response to the second client using the second context.

12. The method of claim 8, wherein cleansing the first context comprises deleting application specific data.

13. The method of claim 12, wherein the application specific data comprises objects and internal tables.

14. The method of claim 12, wherein cleansing further comprises:
preparing the first application context by saving application server resources and initializing application server and communication frameworks in the first application context.

15. A non-transitory computer-readable medium storing program code, the program code executable by a computer system to cause the computer system to:
receive a message from a first client associated with a first device type;
prepare, via a processor, a first application context associated with a session for a response to the message based on the first device type;
prepare the response to the message;
transmit the response to the first client via the session;
cleanse the first application context associated with the session; and
store the cleansed first application context associated with the session in a pool.

16. The medium of claim 9, wherein the processor is further to execute the processor-executable process steps to cause the system to:
receive a second message from the first client;
determine that the second message is associated with the first device type and that an application context based on the first device type exists in the pool; and
transmit a second response to the first client using the cleansed first application context.

17. The medium of claim 10, wherein the processor is further to execute the processor-executable process steps to cause the system to:
receive a third message from a second client associated with a second device type;
determine that an application context associated with the second device type does not exist in the pool;
create a application context associated with the second device type for use with a second session; and transmit a third response to the second client using the second session.

18. The medium of claim 11, wherein the processor is further to execute the processor-executable process steps to cause the system to:
   receive a fourth message from the second client associated with the second device type;
   determine that the second application context associated with the second device type exists in the pool; and
   transmit a fourth response to the second client using the second context.

19. The method of claim 8, wherein cleansing the first context comprises:
   deleting application specific data; and
   preparing the first application context by saving application server resources and initializing application server and communication frameworks in the first application context.

20. The method of claim 12, wherein the application specific data comprises objects and internal tables.

* * * * *